United States Patent [19]

Scheibel et al.

[11] Patent Number: 4,980,674
[45] Date of Patent: Dec. 25, 1990

[54] ACOUSTIC ASH DEPOSITION MONITOR APPARATUS AND METHOD

[75] Inventors: John R. Scheibel, Fremont, Calif.; Foster B. Stulen, Columbus, Ohio

[73] Assignee: Electric Power Research Institute, Inc., Palo Alto, Calif.

[21] Appl. No.: 441,300

[22] Filed: Nov. 27, 1989

[51] Int. Cl.⁵ .............................................. G08B 21/00
[52] U.S. Cl. ................................... 340/603; 122/379; 73/61.1; 110/185
[58] Field of Search ................ 340/603, 617; 73/61.2, 73/599; 110/185, 349; 122/379, 504.2; 15/316 A, 316 R

[56] References Cited

U.S. PATENT DOCUMENTS 4,603,660  8/1986  Wynnychyj et al. ................ 122/379
4,829,246  5/1989  Mathur et al. ...................... 324/204

Primary Examiner—Joseph A. Orsino
Assistant Examiner—Jeffery A. Hofsass
Attorney, Agent, or Firm—Flehr, Hohbach, Test, Albritton & Herbert

[57] ABSTRACT

An acoustic ash depostion monitoring apparatus for a boiler arrangement having at least one soot blower. The apparatus comprises at least one tone generating apparatus for generating a tone and at least one tone receiving apparatus, located in proximity to the tone generating apparatus, for receiving the tone generated by the tone generating apparatus. Also provided are controlling apparatus for determining when the tone received by the receiving apparatus falls below a predetermined level and for enabling a soot blower in proximity to the tone generating and tone receiving apparatus when the tone received by the receiving apparatus is determined to have fallen below the predetermined level.

18 Claims, 2 Drawing Sheets

ACOUSTIC ASH DEPOSITION MONITOR

ACOUSTIC ASH DEPOSITION MONITOR

TIME HISTORIES

ACOUSTIC ASH DEPOSITION MONITOR
APPARATUS AND METHOD

BACKGROUND OF THE INVENTION

The present invention relates to acoustic ash deposit monitor apparatus for the early detection of soot accumulation in a boiler apparatus and to a method of detection. More specifically, the present invention relates to soot monitoring apparatus employing acoustic signals.

SUMMARY OF THE PRIOR ART

The prior art for the present invention includes furnace boiler arrangements in general and, more specifically, equipment for the detection of soot buildup in a furnace boiler.

In general, in a furnace boiler arrangement heat exchange tubes are suspended within the furnace boiler. Steam propagates through these heat exchange tubes and is heated to produce super heated steam as it passes through the boiler. The furnace may be a coal burning furnace. As the coal burns, a substantial portion of its ash is collected below the burning surface or at the burning surface. A significant portion, however, becomes part of the flue gas and rises above the burning coal and flows through the exchange tubes as it propagates out to the exhaust mechanism. As the flue gas propagates through the exchange tubes, heating the tubes, the ash and soot from the burning material may deposit upon the heat exchange tubes. Over time, as an accumulation of ash and soot on the exchange tubes grows they insulate the tubes and the ability of the burning material in the furnace to heat the steam in the exchange tubes decreases.

Technology, known as soot blowers, are used to remove soot and ash that has deposited on the heat exchange tubes. These soot blowers may be located at various locations throughout the furnace boiler. Initial prior art methods for determining when the amount of soot or ash deposition on the exchange tubes was significant enough to constitute activating the soot blowers was to measure the output temperature of the steam. When the temperature of the super heated steam fell below a certain temperature it was an indication of insufficient heat exchange. It was assumed that the insufficiency was most likely caused by a deposition of ash or soot on the exchange tubes. This method, however, was not desirable because it necessitated a fall in the output steam temperature to indicate substantial soot deposition. Alternatively, it was desired to create a device that would notify the furnace blower operator of soot accumulation before the output temperature of the steam significantly affected.

Methods have been devised to measure the heat transfer at various locations in the furnace boiler. These methods attempt to indicate a drop in the heat transfer function for the steam in the exchange tubes and include the use of heat flux sensors located internal to the boiler. One of these discloses a blower system comprising a plurality of soot blowers, each of which is selectively operable to clean ash deposits from the walls of a furnace chamber in direct response to the local heat transfer rate from the hot combustion products to the wall of the furnace. One or more heat flux meters are mounted to the furnace wall in the general region surrounding each of the soot blowers.

A similar method discloses determining the buildup of ash in a pulverized coal fired boiler by comparing the heat flux simultaneously detected by a first flux detector which is maintained free of deposits and a second flux detector in which deposits are permitted to form. The net value from a heat flux comparison is proportional to the heat flux which is not reaching the boiler walls as a result of the ash deposits.

In addition there are also devices that acoustically search for leaks or cracks in the physical boiler itself. One of these methods discloses detecting abnormal conditions in a boiler from the sound wave which is generated when water or steam spouts from the pressure part of the boiler.

A similar device discloses acoustic emission testing in which broad band frequency noise is distinguished from narrowband acoustic emission signals, wherein the later are valid events indicative of structural flaws in the material being examined. This is accomplished by separating out those signals which contain frequency components in the range of valid acoustic emission events.

OBJECTS AND SUMMARY OF THE INVENTION

It is the object of the present invention to provide a boiler monitor capable of providing early warning of ash or soot accumulation so that soot blowers may be activated before a significant reduction in output steam temperature is experienced.

It is another object of the present invention to provide localized monitors so that detection of ash accumulation may be done locally thereby necessitating only local activation of soot blowers.

It is another object of the present invention to provide an acoustic ash accumulation monitor providing precise and spatially efficient detection of ash or soot accumulation.

An acoustic ash deposition monitor apparatus and method in accordance with this invention has at least acoustic signal or tone generating apparatus for generating an acoustic signal and at least one acoustic signal or tone receiving apparatus, located in proximity to the generating apparatus, for receiving generated acoustic signal. Also provided is control apparatus for determining when the acoustic signal received by the receiving apparatus falls below a predetermined level and enabling a soot blower in proximity to the signal generating and receiving apparatus when the signal received by the receiving apparatus is determined to have fallen below a predetermined level. The present invention, however, is not limited to signal processing involving a threshold determination. It also includes other methods of processing, for example, cross correlation of the input and output signals, which may yield a more sensitive ash deposition measurement.

The attainment of the foregoing and related objects, advantages and features of the invention should be more readily apparent to those skilled in the art, after review of the following more detailed description of the invention taken together with the drawings, in which:

DETAILED DESCRIPTION OF THE PREFERRED EMBODIMENTS

Figure 1:
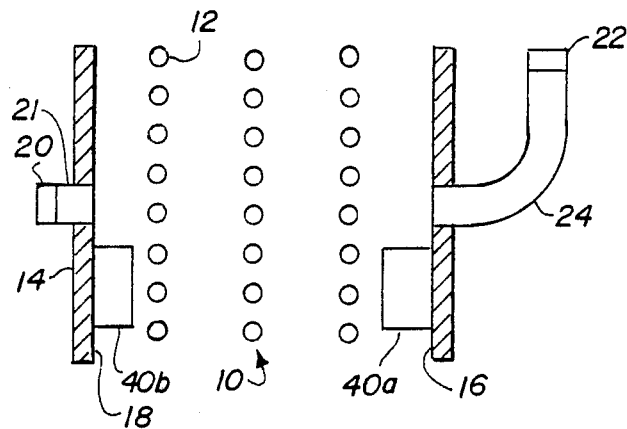
FIG. 1 is a cross-sectional view of the upper portion of a boiler, illustrating the heat exchange tubes and the acoustic ash or soot monitoring apparatus, of the preferred embodiment.

Referring to FIG. 1, a cross-sectional illustration of the acoustic ash or soot deposition monitoring system of the preferred embodiment is shown. In the system 10 a plurality of heat exchange tubes 12 are located within the boiler enclosure 14. The heat exchange tubes are shown as circles to illustrate their cross-section. They are also shown here to be uniformly arranged inside the boiler enclosure 14. Other arrangements however, may be equally suitable.

The boiler enclosure 14 is defined, in the cross-section, by two walls 16 and 18. The boiler enclosure 14 is representative of the upper portion of a boiler, or that region through which the flue gas super heats steam in the exchange tubes 12. An acoustic signal generator 20 (or tone generator) is coupled to the boiler enclosure 14 through the wall 18. The acoustic signal or tone, etc., radiate from the signal generator into the boiler enclosure 14. The acoustic signal generator is responsible for generating acoustic signals which propagate through the area of the boiler containing the heat exchange tubes 12. The acoustic signal in generator 20, in the preferred embodiment, may be a loud speaker. The acoustic signal generator 20 preferably generates a pneumatic whistle. The practical lower limit for a pneumatic whistle is approximately 3 kHz. This is primarily due to the volume of air that must be supplied to the whistle. Steam whistles that are used in factories in fact can go to lower frequencies although a practical limit is 500 Hz. The electrodynamics drivers (i.e., speakers) are limited in range from 400 Hz to 5000 Hz for a single unit to produce an acoustic pressure approaching 150 dB at one meter.

The amplitude and frequency of the driver 20 is selected with respect to both background noise and signal attenuation as functions of frequency. The frequency must be high enough to minimize background noise, since noise decreases as frequency increases. Signal attenuation, however, becomes significant at higher frequencies. Therefore, for a given application (i.e., specific boiler) there is an optimal frequency range. Typically this is on the order of 500 Hz to 5000 Hertz. Once the frequency band is selected the amplitude should be as high as possible to maximize signal-to-noise ratio. Typical sound levels from electrodynamic designs are nominally 140 dB over a broad frequency range. Whistles can generate pure tones at levels approaching 150 dB. Note, signal processing such as pulse compression can help improve the signal-to-noise ratio even though the amplitude of generators may be relatively weak.

In an area of the boiler 10, generally opposite the tone generator 20, a microphone 22 is located. The microphone 22 is separated from the boiler enclosure 14 by an acoustic waveguide 24. A wave guide 21 is also used to couple the sound source 20 to the boiler cavity 15.

The purpose of the acoustic waveguide 24 is to allow acoustic signals from the tone generator to propagate to the microphone 22 while still allowing the microphone 22 to maintain a desired distance from the boiler enclosure 14. The purpose of maintaining a distance between the boiler enclosure 14 and the microphone 22 is to decrease the effects of the boiler heat on the microphone 22, and thereby to increase the life of the microphone 22.

Flue gas propagates through the boiler enclosure 14. As the flue gas propagates through this region ash deposits build up on the heat exchange tubes 12. As mentioned in the prior art, the result of ash accumulation on the heat exchange tubes is a decrease in the amount of heat which is transferred to the tubes to super heat the steam therein. Ash and soot building up on the tubes 12 acts as an insulator. The greater the accumulation, the greater the insulation and thereby the less heat received by the steam. The resulting signal attenuation is trended to determine the rate of cooling.

The acoustic ash monitoring system is designed to detect when a sufficient amount of ash has accumulated on the exchange tubes to necessitate the activation of a soot blower. The acoustic generator 20 propagates acoustic wave at a certain decibel range, approximately 150 dB. Initially, with the tubes blown clean of soot and ash the microphone 22 will receive a signal propagated by the acoustic signal generator 20 at the same strength, 150 dB, as it was sent. The 150 dB level is monitored at the microphone 22. When the decibel range received at the microphone falls below 5 to 10 decibels it is indicative that the exchange tubes 12 need to be cleaned. At that time the soot blower control system 42 is enabled so that the soot blowers 40a and 40b may clean the soot and ash off the heat exchange tubes 12.

There are several factors which must be taken into consideration in determining signal attenuation as it passes through hot, ash-laden gas. These factors which attenuate sound include:

Classical absorption—heat conduction and viscosity effects.
Thermal relaxation—additional energy absorption by gas. This mechanism becomes significant at elevated temperatures.
Scattering and absorption of sound by ash particles.
Scattering of sound by thermal gradients.

The classical absorption is that portion which normally accounts for the increase in attenuation as a function of frequency squared. The other mechanisms combine to significantly increase the attenuation. The unusually high attenuation has been discussed in one or two reports discussing acoustic leak detection.

In no way should one expect to observe the same sound level at the microphone as was input at the source. Rather, the sound is attenuated least when the surfaces are clean compared to when they are covered with ash. One needs to establish the received signal level when the boiler is cleaned for the basis of comparison. The dirty versus clean condition does represent about a 5 to 10 dB differential in the received signal. This is equivalent to a percentage decrease of 56 percent to 30 percent of the signal level when the boiler is clean. This is a fairly tight range in terms of absolute signal strength.

In a boiler arrangement there will be several signal generator 20 — microphone 22 pairs disposed at apparent locations. For each of these locations there will be soot blowing apparatus located in a close proximity thereto. Having a plurality of signal generators and microphone pairs enables the identification of which portions of the boiler are developing a significant amount of ash accumulation. For example, it is quite conceivable that one portion of the exchange tubes may receive heavier ash deposition than another portion. In that situation the amount of acoustic wave generator-microphone pair would indicate that ash has accumulated to a certain undesirable level. At that time the local soot blowers in that portion of the boiler would be activated to clean the exchange tubes only in that portion, as opposed to activating soot blowers to clean the entire exchange tube portion of the boiler 14. By cleaning only those portions of the boiler containing exchange tubes with significant ash accumulation, power is not wasted as it would be if the entire exchange tube unit was cleaned every time a threshold level was reached for a particular location. This has significant economic advantage.

Figure 2:
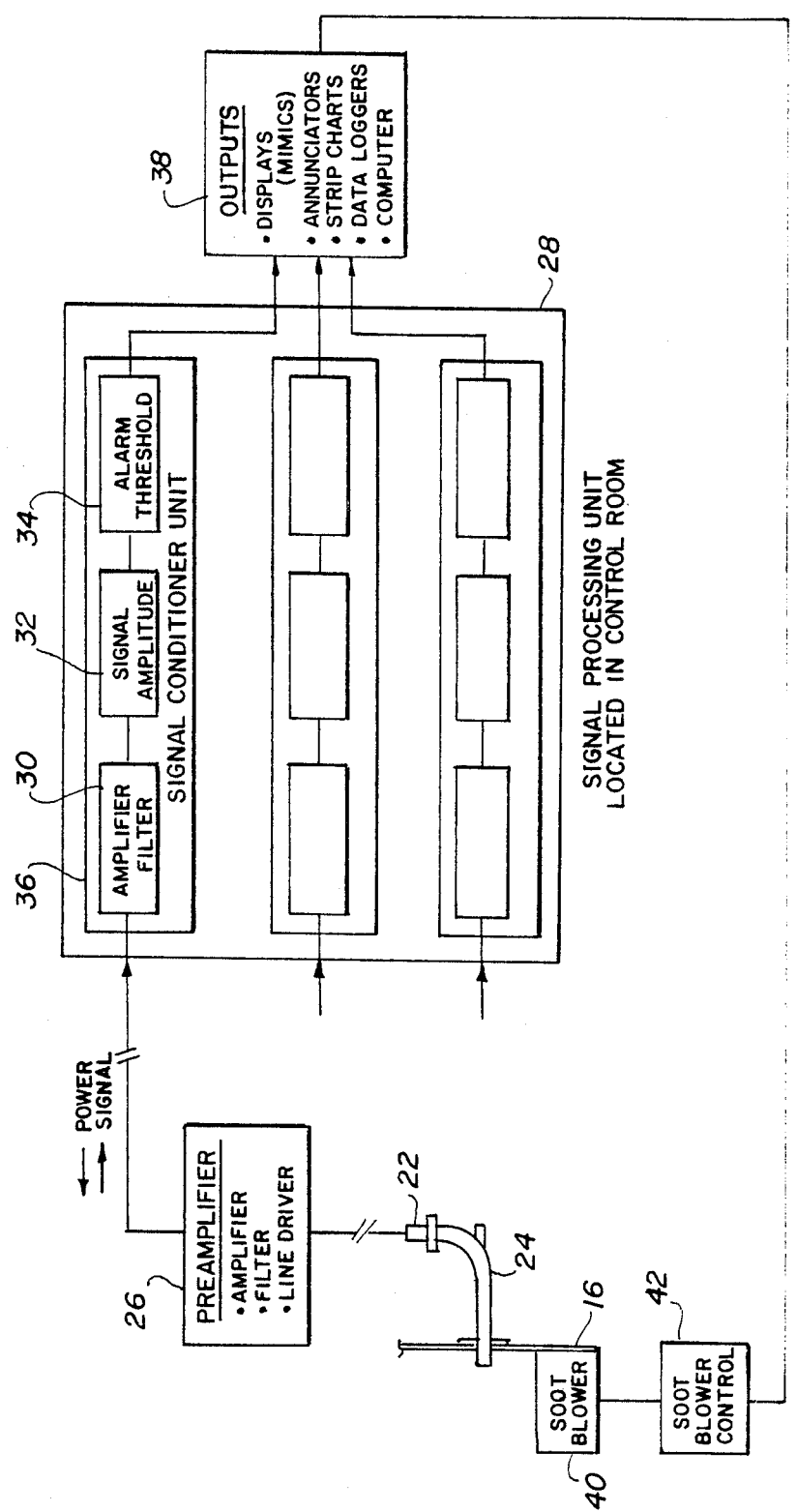
FIG. 2 is a diagrammatical illustration of the processing unit of the preferred embodiment.

Referring to FIG. 2, a diagrammatical illustration of the processing aspects of the acoustic monitoring system 10 are shown. The signal or whistle from the acoustic generator 20 propagates through the waveguide opening 24 in the wall 16 towards the microphone 22. At the microphone 22 the acoustic signal is transduced into an electrical signal. This electrical signal is transmitted from the microphone 22 to a preamplifier stage 26. At the preamplifier stage, the signal is filtered and amplified. Suitable electrical components to provide the preamplification function include line drivers, filters and amplifiers. A signal output from the preamplifier 26 is indicative of the amplitude of the acoustic signal. The electrical signal then propagates to a signal processing unit 28 which would be located in a boiler facility control room.

The signal processing unit 22 contains signal conditioner units 36, one for each of the acoustic signal generator microphone pairs. In FIG. 2, only one of these signal conditioner units is illustrated. It is, however, representative of all. Each of the units 36 contains an amplifier filter 30 for amplifying a specific filtered portion of the input electrical signal. The signal then propagates to a signal amplitude device 32 for amplitude modification. The output of the signal amplitude device 32 is applied to an alarm threshold 34. An alarm level is set 5 dB below the signal level corresponding to clean boiler 10 conditions. This is done in a calibration procedure (well known in the art) performed immediately following an outage when the tubes were washed. It can also be done or checked for a given source/microphone pair immediately following cleaning by soot blowers.

The alarm threshold is activated when the received signal falls 5 dB below the signal level corresponding to clean boiler conditions. The alarm threshold 34, in addition to sampling the input signal, passes the electrical signal through to the output unit 38. Both the input signal (information signal) and the alarm signal are connected to an output unit 38.

The output unit 38 comprises displays, annunciators, strip charts, data loggers, as well as computers. Should an alarm situation be indicated, necessary steps are taken in the output unit 38 to enable the soot blowing device 40 located in close proximity to the tone generator-microphone pair responsible for triggering the alarm condition. Data loggers and strip charts are operated constantly to monitor decibel output levels and other information contained in the input signals. One important aspect is to assure that once soot blowers are activated the decibel range of the acoustic signal (at the receiver) is improved. Soot blower effectiveness can be judged by the recovery of signal amplitude. The annunciators are used to indicate alarm conditions and other control factors. The computers are used as control devices and to process data. The output from the output unit 38 is used to activate the soot blower control unit 42 which in turn activates the local soot blower 40.

Figure 3:
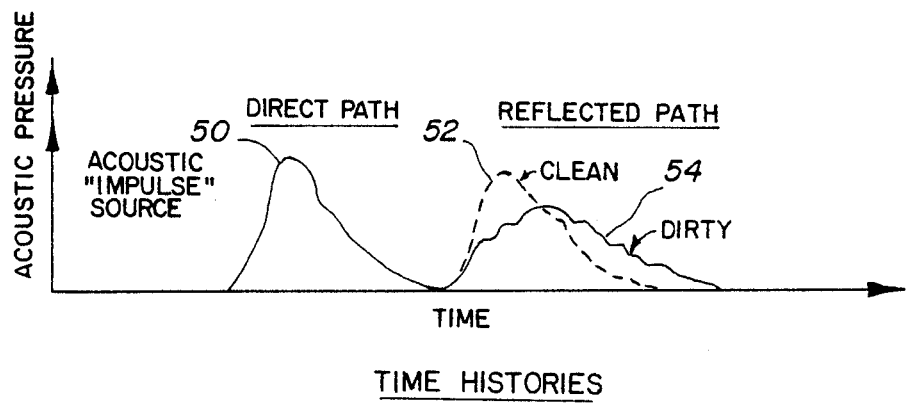
FIG. 3 is a graphical illustration of the acoustic impulse signal of the preferred embodiment as a function of time.

Referring to FIG. 3, a graphical illustration of acoustic pressure with respect to time is presented. A first graphical image 50 represents the acoustic impulse source generated by the tone generator 20. This signal propagates on a direct path through the heat exchange tubes 12 to the microphone 22. Similarly, the second graphical image 52, illustrated by a dashed line, illustrates the acoustic pressure with respect to time for a signal propagating from the tone generator 20 to the microphone 22 by a reflective path when the exchange tubes are cleaned. Lastly, graphical representation 54 illustrates the same acoustic pressure signal when the heat exchange tubes 12 are dirty, or, in other words, have significant ash and soot accumulations. It is noted that the received signal that was sent through dirty exchange tubes 12 is significantly less than that for clean tubes.

In summary, the present invention provides an efficient, inexpensive and durable method of determining ash and soot deposition on heat exchange tubes before any significant variation in the temperature of the superheated steam is experienced.

The acoustic ash deposition monitor apparatus and method provides information on the rate of boiler fouling which can then be used to indicate to the operator or control system when soot blowing is necessary and which area in the boiler requires cleaning. Boiler performance is improved by more effective ash removal. Steam consumption is reduced by only selectively using soot boilers in fouled areas.

It should be further apparent to those skilled in the art that various changes in form and details of the invention as shown and described may be made. It is intended that such changes be included within the spirit and scope of the claims adhered to.

What is claimed is:

1. An acoustic ash deposition monitoring apparatus for a boiler arrangement having at least one soot blower, comprising:
   at least one tone generating means for generating a tone;
   at least one tone receiving means, located in proximity to said tone generating means, for receiving said tone generated by said tone generating means and generating a signal representation of the amplitude of said tone; and
   means for receiving said signal and determining when said tone received by the receiving means falls below a predetermined amplitude and producing a control signal; and
   means for enabling a soot blower in proximity to said tone generating means and said tone receiving means in response to said control signal.

2. The apparatus of claim 1 wherein the tone generating means includes a loud speaker.

3. The apparatus of claim 2 wherein the tone generating means includes a pneumatic whistle.

4. The apparatus of claim 3 wherein the generated tone is a pure tone in the frequency range of 500 to 5000 Hz.

5. The apparatus of claim 4 wherein the generated tone has a decibel level range of 130 dB to 160 dB.

6. The apparatus of claim 1 wherein the tone receiving means is a microphone.

7. The apparatus of claim 6 further comprises:

a plurality of acoustic waveguides, one of said plurality of acoustic waveguides extending the tone generating means from a boiler wall and another of said plurality of acoustic waveguides extending the tone receiving means from a boiler wall, thereby providing heat insulation protection to said tone generating and receiving means.

8. The apparatus of claim 1 wherein the controlling means determines the difference in the level of the tone as generated and as received and if that difference in the tone received is approximately 5 to 10 decibels less than the tone generated a soot blower is activated.

9. The apparatus of claim 8 wherein each of said tone generating means and said tone receiving means form a pair, the soot blower located in closest proximity to said pair being activated when the tone received by said tone receiving means fall below the predetermined level.

10. In a steam boiler arrangement having a plurality of heat exchange tubes, an acoustic ash deposition early detection apparatus for detecting accumulation of ash on said heat exchange tubes so that at least one soot blower located in proximity to said heat exchange tubes can be activated when appropriate, comprising:
   acoustic signal generating means for generating an acoustic signal of specific frequency and decibel range;
   acoustic signal receiving means for receiving said generated acoustic signal and generating a signal representative of said acoustic signal, said acoustic signal receiving means being located so that the generated tone must propagate through a substantial portion of the plurality of heat exchange tubes before being received at said acoustic signal receiving means; and
   means for determining whether said generated signal has fallen below a one determined level; and
   means for activating said soot blower located in proximity to said acoustic signal generating means and said acoustic signal receiving means when said generated signal is determined to be less than the predetermined level, whereby said heat exchange tubes are cleaned of ash before any significant reduction in the output temperature of steam in said steam boiler occurs.

11. The apparatus of claim 10 wherein said acoustic signal is a pneumatic whistle of sufficient decibel range to be distinguishable over the noise of the boiler furnace.

12. An apparatus for early detection of soot accumulation on a plurality of heat exchange tubes in a steam boiler, comprising:
   a plurality of acoustic signal generating means and receiving means pairs, each pair propagating an acoustic signal through a substantial portion of said plurality of heat exchange tubes;
   each receiving means determining whether the acoustic signal received is below a predefined level of the acoustic signal as it was generated; and
   means for activating at least one soot blower in proximity to any pair for which it is determined that the received acoustic signal is below the predefined level, thereby any one of the plurality of soot blowers is activated when specifically needed rather than activating all, resulting in significant power expenditure reduction.

13. A method of early detection of soot accumulation and for efficiently reducing the soot accumulation by activating only specific soot blowers when soot accumulation is detected, comprising the steps of:
   generating an acoustic signal:
   receiving said generated acoustic signal after it has propagated through a substantial portion of said plurality of heat exchange tubes;
   measuring the level of the signal receiving to determine if it has fallen below a predetermined level; and
   activating the soot blower in closest proximity to the area of the plurality of heat exchange tubes through which the acoustic signal propagated to clean said portion of the plurality of heat exchange tubes, whereby the heat exchange tubes are efficiently cleaned and said cleaning takes place before any significant reduction in output steam temperature occurs.

14. The method of claim 13 wherein the step of generating an acoustic signal comprises the step of providing a pneumatic whistle.

15. The method of claim 14 wherein the step of generating an acoustic signal comprises the step of generating a pure tone in the frequency range of 500 to 5000 Hz.

16. The method of claim 15 wherein the step of generating an acoustic signal comprises the step of generating an acoustic signal of approximately 150 dB.

17. The method of claim 13 wherein the step of receiving an acoustic signal comprises the step of providing a microphone.

18. The method of claim 17 further comprising the step of insulating said acoustic signal generating means by extending said acoustic signal generating means from a boiler wall with an acoustic waveguide and insulating said acoustic signal receiving means by extending said acoustic signal receiving means from a boiler wall with an acoustic waveguide.

* * * * *